US011232511B1

(12) United States Patent
Zehr et al.

(10) Patent No.: US 11,232,511 B1
(45) Date of Patent: Jan. 25, 2022

(54) COMPUTER VISION BASED TRACKING OF ITEM UTILIZATION

(71) Applicant: A9.com, Inc., Palo Alto, CA (US)

(72) Inventors: Andrea Zehr, Palo Alto, CA (US);
Caroline Gehrig, San Francisco, CA (US); Mark Scott Waldo, Richmond, CA (US); Stefan Vant, Seattle, WA (US)

(73) Assignee: A9.COM, INC., Palo Alto, CA (US)

( * ) Notice: Subject to any disclaimer, the term of this patent is extended or adjusted under 35 U.S.C. 154(b) by 492 days.

(21) Appl. No.: 15/824,172

(22) Filed: Nov. 28, 2017

(51) Int. Cl.
*G06Q 30/00* (2012.01)
*G06Q 30/06* (2012.01)
*G06N 3/08* (2006.01)

(52) U.S. Cl.
CPC .......... *G06Q 30/0643* (2013.01); *G06N 3/08* (2013.01)

(58) Field of Classification Search
None
See application file for complete search history.

(56) References Cited

U.S. PATENT DOCUMENTS

| 7,945,099 | B2 * | 5/2011 | Gokturk | G06K 9/00664 |
| | | | | 382/209 |
| 10,290,136 | B2 * | 5/2019 | Kristal | G06T 11/60 |
| 10,373,231 | B2 * | 8/2019 | Jensen | G06F 16/5838 |
| 2007/0225859 | A1 * | 9/2007 | Kolesnychenko | G06Q 10/087 |
| | | | | 700/216 |
| 2012/0239513 | A1 * | 9/2012 | Oliver | G06Q 30/06 |
| | | | | 705/14.73 |
| 2013/0033591 | A1 * | 2/2013 | Takahashi | G06K 9/50 |
| | | | | 348/77 |
| 2013/0339197 | A1 * | 12/2013 | Lewis | G06Q 30/0601 |
| | | | | 705/27.1 |
| 2016/0110793 | A1 * | 4/2016 | Herring | G06K 9/00221 |
| | | | | 705/26.64 |
| 2016/0110886 | A1 * | 4/2016 | Iwaki | G06K 9/00369 |
| | | | | 382/111 |
| 2017/0316537 | A1 * | 11/2017 | Drzymala | G06Q 90/20 |
| 2018/0005375 | A1 * | 1/2018 | Krimon | G06K 9/00369 |
| 2018/0182016 | A1 * | 6/2018 | Giampaolo | G06Q 30/0631 |

(Continued)

OTHER PUBLICATIONS

Zheng Qin, "Introduction to E-commerce", 2009, Springer, springer. com (Year: 2009).*

(Continued)

*Primary Examiner* — Naeem U Haq
*Assistant Examiner* — Norman Donald Sutch, Jr.
(74) *Attorney, Agent, or Firm* — Hogan Lovells US LLP

(57) ABSTRACT

Various embodiments provide techniques for generating a virtual wardrobe in which wearing of items can be tracked through computer vision. In various embodiments, computer vision techniques can be used to identify individual clothing items from an image or video of a closet containing a collection of clothes, in which some of the items may be partially obscured, such as positioned behind other items, folded, at an odd viewing angle, shadowed, or the like. Through the present techniques, the clothing items may be automatically cataloged, and utilization of individual items can be tracked automatically based on additional image data of instances in which an item is worn. Various recommendations can then be made based on the attributes of the items in the virtual wardrobe or utilization of the items.

19 Claims, 10 Drawing Sheets

(56) References Cited

U.S. PATENT DOCUMENTS

2019/0066373 A1* 2/2019 Tran .................. G06K 9/00785
2020/0104633 A1* 4/2020 Zheng ................... G06K 9/726

OTHER PUBLICATIONS

Aggarwal et al; "Human Motion Analysis: A Review"; 1999; Computer Vision and Image Understanding vol. 73, No. 3, March, pp. 428-440 (Year: 1999).*

Bhavya Kalra et al; "Computer Vision Based Personalized Clothing Assistance System: A Proposed Model"; Oct. 2016; 2016 2nd International Conference on Next Generation Computing Technologies (NGCT-2016) Dehradun, India Oct. 14-16, 2016 (Year: 2016).*

* cited by examiner

COMPUTER VISION BASED TRACKING OF ITEM UTILIZATION

BACKGROUND

Advancements in electronic commerce (e-commerce) technology have made it more and more convenient for consumers to purchase apparel items. Not only has e-commerce enabled consumers to browse catalogs of an ever-increasing number of retailers, but it has also enabled peer-to-peer marketplaces, which allows users to post items for sale that can be purchased by other users. Such platforms are particularly popular for selling second-hand items. However, although technology has revolutionized the apparel industry, such technology-based advantages typically stop once the consumer receives the goods. For example, optimal organization and utilization of apparel items remains a challenge for consumers. Technology-based solutions have been attempted, such as applications for cataloging the apparel items owned by a user. However, such applications require a great amount of manual data entry by the user, which may be taxing and error prone.

BRIEF DESCRIPTION OF THE DRAWINGS

Various embodiments in accordance with the present disclosure will be described with reference to the drawings, in which.

DETAILED DESCRIPTION

Figure 1:
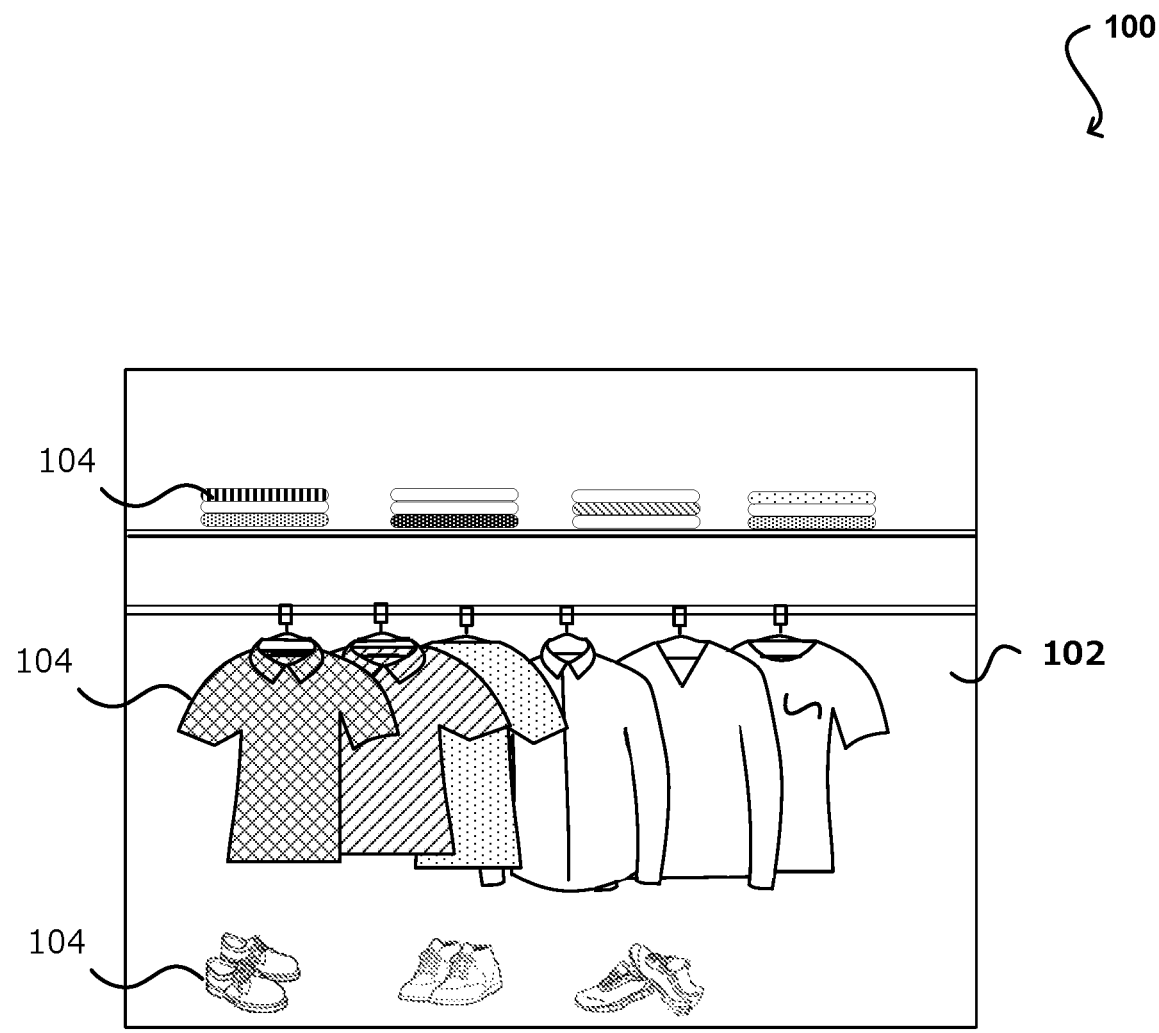
FIG. 1 illustrates an example scenario in which various embodiments of the present disclosure may be utilized.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Systems and methods in accordance with various embodiments of the present disclosure may overcome one or more of the aforementioned and other deficiencies experienced in conventional approaches for object recognition and utilization. In particular, various embodiments provide techniques for generating a virtual wardrobe in which wearing of items can be tracked through computer vision. In various embodiments, computer vision techniques can be used to identify individual clothing items from an image or video of a closet containing a collection of clothes, in which some of the items may be partially obscured, such as positioned behind other items, folded, at an odd viewing angle, shadowed, or the like. Through the present techniques, the clothing items may be automatically cataloged, and utilization of individual items can be tracked automatically based on additional image data of instances in which an item is worn.

In various embodiments, an initial image (e.g., still image, video) of a collection of items may be capture and received. For example, the initial image may include an image of the inside of a closet or wardrobe having a plurality of apparel items contained therein. The apparel items may be positioned in the closet in a wide variety of ways, such as hung on hangers across a rack, folded and stacked, and the like. The initial image may be analyzed and individual items of the collection can be detected. In various embodiments, the individual items may be detected using an object detection model. In some embodiments, the individual items may be detected based on edge detection or other techniques through which pixels or a region of the initial image may be determined to pertain to an individual item. In some embodiments, a machine learning model, such as a neural network based model may be used to detect the individual items. Such a model may be trained using training images of similar scenes, in which the training images are annotated with information such as the number and location of individual items present in the training images.

Through further analysis, some respective attributes of the detected individual items may be determined. For example, a color or pattern of an individual item may be determined. Additional attributes that may be determined include item type (e.g., dress, pants, t-shirt), item style (e.g, business, casual, cold weather), size, texture, brand, item type, style classification, color, material, pattern, length, utilization dates, frequency of utilization, utilization with another item, purchase date, or current market value, among others. In various embodiments, one or more respective attributes for an individual item may be determined using a machine learning model, such as the abovementioned neural network based model, which analyzes the portion of the initial image identified as pertaining to the individual item to extract features therefrom. The features may then be analyzed to determine the one or more attributes. Since the individual items may be positioned in a configuration in which portions of certain items may be obstructed or hidden, it may be the case that some attributes of an item may not be able to be determined, or have a low degree of certainly, thus resulting in an incomplete data profile for that item. In some embodiments, a user may optionally be prompted to provide data, such as some of the indeterminable attributes to complete the data profile for each item in the collection. Thus, regardless of whether the item profiles for the items are complete, a preliminary collection profile may be generated from the item profiles. A collection profile may serve as an electronic catalog of the items available for utilization, and as a baseline for tracking utilization of the individual items.

Tracking utilization of items in the collection through computer vision may further include the capture and analysis of additional images associated with utilization instances. For example, an additional images may include an image of an certain outfit being worn, in which the outfit includes one or more apparel items of the collection of apparel items in the initial image of a closet. The additional images may be captured from day to day, or whenever an item is utilized (e.g., worn). Specifically, in various embodiments, utilization (e.g., being worn) refers to an organic utilization scenario, such as a user actually wearing an item organically as a part of their attire. An additional image may be analyzed to identify an item appearing therein. Various attributes of the item may be determined, such as using an object recognition model. The item in the additional image may be matched, based on its attributes, to an item in the electronic catalog of items available for utilization generated above based on the initial image. Thus, a utilization instance of that item may be recorded. The utilization instance may be associated with a time parameter, such as a date of the utilization instance or a time lapse since the utilization instance. In various embodiments, the additional image of the item may provide a better view of the item, and therefore provide additional attributes of the item that were previous indeterminable from the initial image. These additional attributes are added to the data profile of the item. Thus, utilization of the items can be tracked over time based on matching items identified in additional images to items in the electronic catalog. Data from the utilization tracking can be analyzed and used in several ways, such as to make automatic recommendations to a user regarding the items. For example, if it is determined that a certain apparel item has not been worn in a certain period of time (e.g., a year), a recommendation to sell that item on a peer-to-peer electronic market place may be made. Various information associated with this recommendation may be determined based on the attributes of the item, such as an estimated market value of the item.

Various other features and application can be implemented based on, and thus practice, the above described technology and presently disclosed techniques. Accordingly, approaches in accordance with various embodiments provide techniques that enable an improvement to computer vision technology. In real world applications of computer vision, objects may be positioned organically, rather than specifically arranged for the purpose object detection. Thus, one particular shortcoming in computer vision technology is the ability to perform object recognition, or otherwise ascertain information about an object, from images in which the view of object is obstructed or otherwise incomplete. The present techniques aim to overcome this challenge in at least some circumstances by identifying matching objects in multiple images, obtaining attribute data from the multiple images respectively, and stitching the data together to provide object recognition or attribute detection of the object.

Additionally, over time, the application of such techniques can train models to determine more object attributes, lending to better object recognition, from images in which objects are partially obscured, or having otherwise traditionally challenging views. Improvements to computer vision and object recognition techniques are inherently an improvement to computing technology as it improves and/or provides new capabilities of computing machines. Various other applications, processes, and uses are presented below with respect to the various embodiments, each of which improves the operation and performance of the computing device(s) on which they are implemented.

FIG. 1 illustrates an example scenario 100 in which various embodiments of the present disclosure may be utilized, in accordance with various embodiments. As mentioned, advancements in e-commerce technology have made it more and more convenient for consumers to purchase products from a wide variety of retailers and even peer-to-peer electronic marketplaces. Although technology has revolutionized the apparel industry by providing less frictional shopping and transaction experiences, organization and tracking of purchased items remains a challenge for consumers. For Example, as illustrated in FIG. 1, a user may have a closet 102 full of apparel items 104 available for wear, such dresses, pants, shirts, sweaters, shoes, among others. However, given the high quantity of items, it may be difficult for the user to always remember every item that they own or how often they wear an item.

A situation may arise in which one or more of the apparel items 104 available for wear is not worn in a certain period of time, which may be an indication that those apparel items are no longer in favor or forgotten and can be eliminated from the closet, freeing up real estate. It may be advantageous to sell or donate such items. However, because it may be difficult for the user to realize they no wear a certain item or have forgotten about a certain item. Thus, it may be advantageous to be able electronically catalog of the apparel items 104 available for wear and track when each item is worn (i.e., utilized) with minimal input or actions required by the user. The utilization data, as well as other attribute data, may be used to determine certain insights and notifications, including various recommendations.

Conventional means of generating an electronic catalog may require a large amount of manual data entry from the user, such as creating an entry for each item in their collection of apparel items 104 and populating various attributes associated with that item, such as item type, brand, color, etc. Thus, it may be advantageous to use computer vision techniques to automatically identify individual items from an image data of the entire closet, with the apparel items arranged in organic positions, requiring minimal intervention and setup by the user, and automatically catalog the identified items. However, apparel items arranged in organic positions are likely to be hung closely together, folded, and stacked, thus providing a limited and incomplete view of the items in an image capture. This presents a technical challenge as a shortcoming in current computer vision technology is the ability to perform object recognition, or otherwise ascertain information about an object, from images in which the view of object is obstructed or otherwise incomplete. The present techniques aim to overcome this technical challenge by identifying matching objects in multiple images, obtaining attribute data from the multiple images respectively, and stitching the data together to provide object recognition or attribute detection of the object. Thus, items can be cataloged through the presently disclosed computer vision techniques and utilization of the items can also be tracked.

Figure 2A:
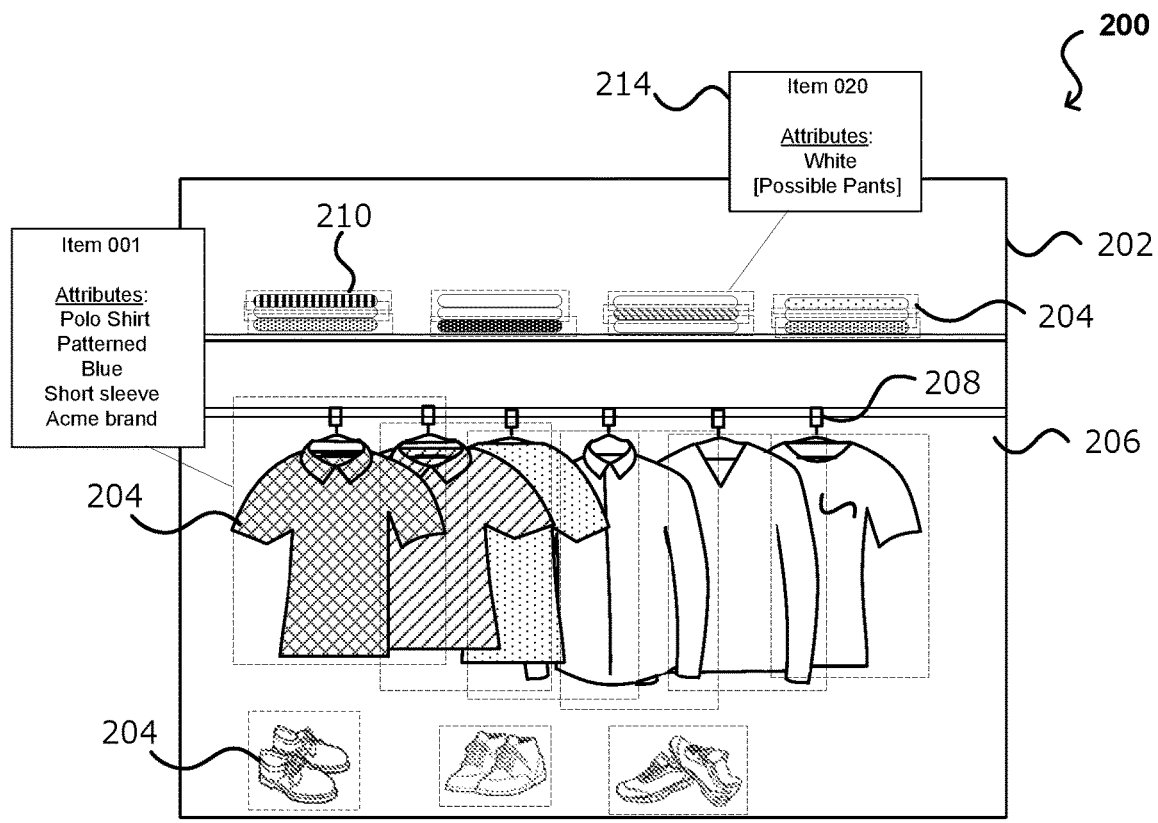
FIG. 2A illustrates an example representation of computer vision techniques for generating an electronic catalog of a collection of items, in accordance with various embodiments of the present disclosure.

FIG. 2A illustrates an example representation 200 of computer vision techniques for generating an electronic catalog of a collection of items, in accordance with various embodiments. In various embodiments, an initial image 202 (e.g., first image) of a collection of items 204 may be capture and received. The initial image 202 may be a video, a still image, or a plurality of image stitched together spatially. In this example, the initial image 202 may include image data representing a view of the inside of a closet 206 or wardrobe having a plurality of apparel items 204 contained therein. The apparel items 204 may be positioned in the closet 206 in a wide variety of ways, such as hung 208 on hangers across a rack, folded 210 and stacked, among others. The initial image 202 may be analyzed and individual items 212 of the collection 204 can be detected. In various embodiments, the individual items 212 may be detected using an object detection model. For example, it may be determined that the initial image includes a certain number of individual items. In some embodiments, the individual items 212 may be detected based on edge detection or other techniques through which pixels or a region of the initial image may be determined to pertain to an individual item. In some embodiments, a machine learning model, such as a neural network based model may be used to detect the individual items. Such a model may be trained using training images of similar scenes, in which the training images are annotated with information such as the number and location of individual items present in the training images.

When the individual items 212 are identified, an item profile 214 for each item may be generated, the combination of which makes up a collection profile (e.g., electronic catalog) of the collection of items 204. Through further analysis, some respective attributes of the detected individual items may be determined. For example, a color or pattern of an individual item may be determined. Additional attributes that may be determined include item type (e.g., dress, pants, t-shirt), item style (e.g., business, casual, cold weather), size, texture, brand, among others. In various embodiments, one or more respective attributes for an individual item may be determined using a machine learning model, such as the abovementioned neural network based model, which analyzes the portion of the initial image identified as pertaining to the individual item to extract features therefrom. The features may then be analyzed to determine the one or more attributes. Since the individual items may be positioned in a configuration in which portions of certain items may be obstructed or hidden, it may be the case that some attributes of an item may be indeterminable, or have a low degree of certainly, thus resulting in an incomplete data profile for that item.

In some embodiments, a user may optionally be prompted to provide data, such as some of the indeterminable attributes to complete the item profile 214 for each item in the collection. Thus, regardless of whether the items profiles 214 for the items are complete, a preliminary collection profile may be generated from the item profiles. The collection profile may serve as an electronic catalog of the items available for utilization, and as a baseline for tracking utilization of the individual items. In some embodiments, the collection profile may be linked to a user account, such as a user account at an electronic marketplace, which includes data indicating engagement (e.g., clicks, likes, purchases) with one or more items offered for consumption. In some embodiments, one or more items identified in the initial image 202 may be matched to one or more items with which the user has interacted with on the electronic marketplace. For example, a list of purchased items may be searched to determine if any of the items in the initial image match any of the purchased items. If a match is determined, attributes associated with matched item on the purchased list may be imported to the electronic catalog generated based on the initial image.

Figure 2B:
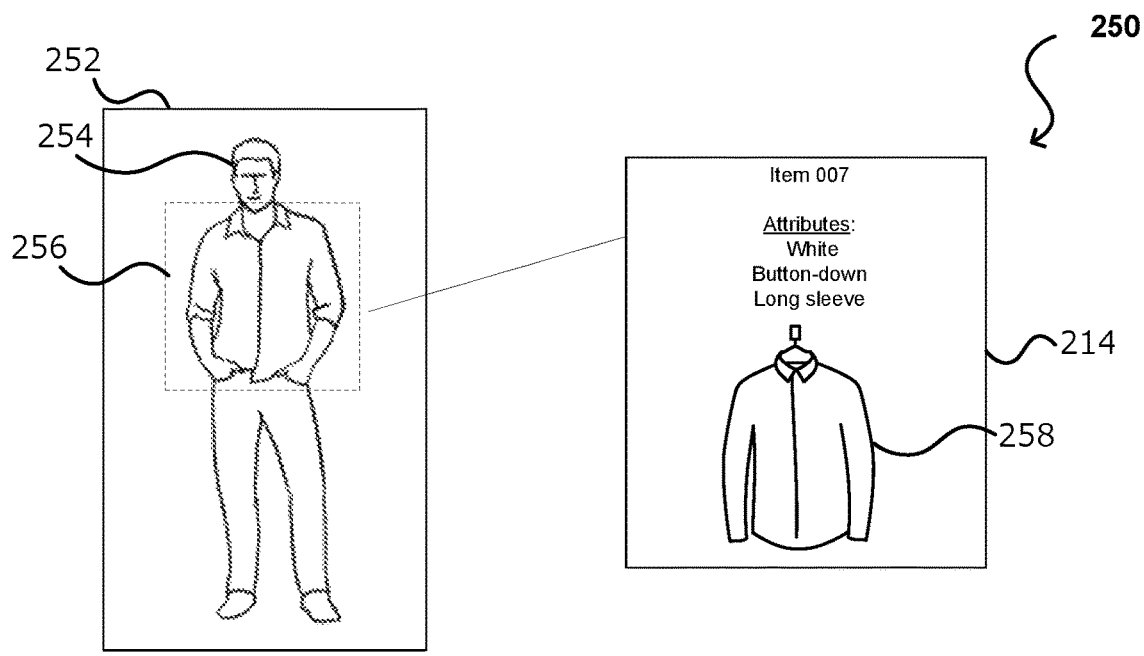
FIG. 2B illustrates an example representation of computer vision techniques for tracking item utilization, in accordance with various embodiments of the present disclosure.

FIG. 2B illustrates an example representation 250 of computer vision techniques for tracking item utilization, in accordance with various embodiments. In various embodiments, as mentioned the electronic catalog generated from the computer vision analysis of the initial image 202 can serve as a baseline for tracking the utilization of individual items in the collection of items. In this example, tracking utilization of items in the collection through computer vision may further include the capture and analysis of additional images associated with utilization instances. For example, an additional image 252 may include an image data representing a certain outfit being worn, such as by the user 254, in which the outfit includes one or more apparel items of the collection of apparel items in the initial image of the closet. The additional images 252 may be captured from day to day, or whenever an item is utilized (e.g., worn). Specifically, in various embodiments, utilization (e.g., being worn) refers to an organic utilization scenario, such as a user actually wearing an item organically as a part of their attire. In some embodiments, the additional images 252 may be capture using a camera controlled by a remote device or through voice commands. An additional image 252 may be analyzed to identify an item 256 appearing therein. Various attributes of the item may be determined, such as using an object recognition model. In some embodiments, a time parameter associated with the image (e.g., date stamp or time stamp of the image) may one such attribute. The item 256 in the additional image may be matched, based on its attributes, to an item 258 in the electronic catalog of items available for utilization generated above based on the initial image. Thus, a utilization instance of that item may be recorded.

In various embodiments, the additional image of the item may provide a better view of the item, and therefore provide additional attributes of the item that may have been previously indeterminable from the initial image. These additional attributes are added to the item profile 214 of the item. In some embodiments, one or more attributes of an item previously determined from the initial image may be overridden by respective attribute determined from the additional image. Thus, utilization of the items can be tracked over time based on matching items identified in additional images to items in the electronic catalog. In some embodiments, the process of matching an item in the additional image may include a confirmation from the user. For example, based on the features extracted from the additional image data and/or attributes of the item determined therefrom, one or more candidate items from the catalog may be determined to be potential matches and presented to the user as choices. The user may confirm that a potential match is indeed the item featured in the additional image 252. In some embodiments, the item detected in the additional image may not correspond to any of the items in the catalog generated from the initial image 202, such as may be the case if it is a new item. In this case, a new item profile, which includes any detected item attributes, can be generated for the new item and added to the catalog.

In various embodiments, a second collection image of the entire collection of items, similar to the initial image 102 of FIG. 1, can be taken at a later point in time. The second collection image may be analyzed similarly to identify individual items represented therein. The identified items may be compared with the items already in the electronic catalog to determine if any changes to the collection have occurred. For example, based on a comparison of the second collection image and the cataloged items, it may be determined that new items have been added. Thus, new entries in the electronic catalog may be made for these new items. In another example, it may be determined that an item in the catalog cannot be found in the second collection image, which may indicate that the item has been removed (e.g., sold, given away, thrown out, put in storage) and are no longer available for utilization. A notification may be generated asking the user to confirm removal of the item. If it is determined that the item is no longer available for utilization, the item may be removed from the catalog or otherwise designated as not available. In some embodiments, the data for that item may be retained.

Figure 3:
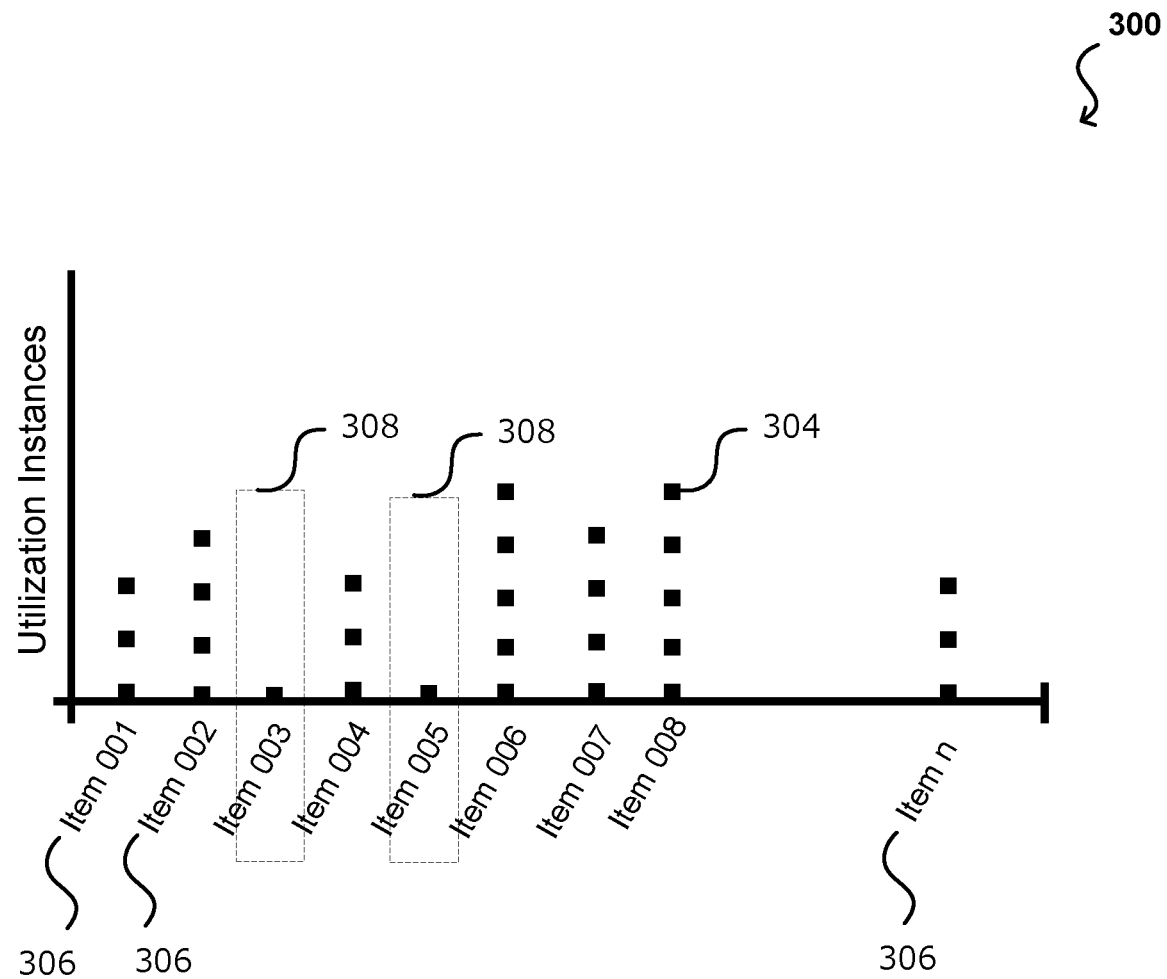
FIG. 3 illustrates an example representation of an application of item utilization tracking, in accordance with various embodiments of the present disclosure.

FIG. 3 illustrates an example representation 300 of an application of item utilization tracking, in accordance with various embodiments. Data obtained from the utilization tracking can be analyzed and used in several ways, such as to make automatic recommendations to a user regarding the items. This example utilization record 300 may represent the utilization of a collection of items over a period time, such as a year. In this example, utilization instances 304 are recorded for each item 306, such as when an additional image is received in which a respective item is detected. Thus, the number of times an item was used can be determined by accessing the utilization record 300. In various embodiments, certain notifications or actions may be determined based on various aspects of the utilization record. Notifications may include a recommendation based at least in part on the record indicating an item having fewer than a threshold number of utilization instances, a recommendation based at least in part on attributes of a plurality of items, an estimated market value of one or more items, a hyperlink to a Web page with recommended products for consumption, or other customized content. For example, it may be determined that the number of utilization instances for an item 308 falls below a threshold number.

A notification may be generated reporting the situation and which may include a recommended action or prompt involving the item. In this example, a notification may be generated recommending that the user offer the underutilized item 308 for consumption (e.g., sale) on an electronic marketplace. The user may accept the recommendation and a content post may be automatically generated and posted to the electronic marketplace. For example, it may be determined that an apparel item owned by the user has not been worn in a long time (i.e., underutilized), which may be an indication that the user is no longer interested in the item and may be interested in selling the item. Various information associated with this recommendation may be determined based on the attributes of the item, such as an estimated market value of the item. In some embodiments, if the user does successfully sell the item, which can be determined based on corresponding account activity or based on input provided by the user, the item may be removed from the electronic catalog or marked as "sold", "unavailable", etc.

Various other types of notifications, recommendations, and actions can be determined based on the utilization record 300 of a collection of items. Recommendation and notification may include items for purchase through an electronic marketplace that may be paired with existing items in the collection or items that are predicted to be favorable to the user based on a style profile determined from the attributes of the items in the collection of items. The recommendations may further include an introduction to another user or user account having similar style. The recommendation may be sent to a content provider such as to provide insight into current trends and inventory suggestions. In come embodiments, such recommendations may be based on multiple collections of items compiled across a plurality of use accounts.

Figure 4:
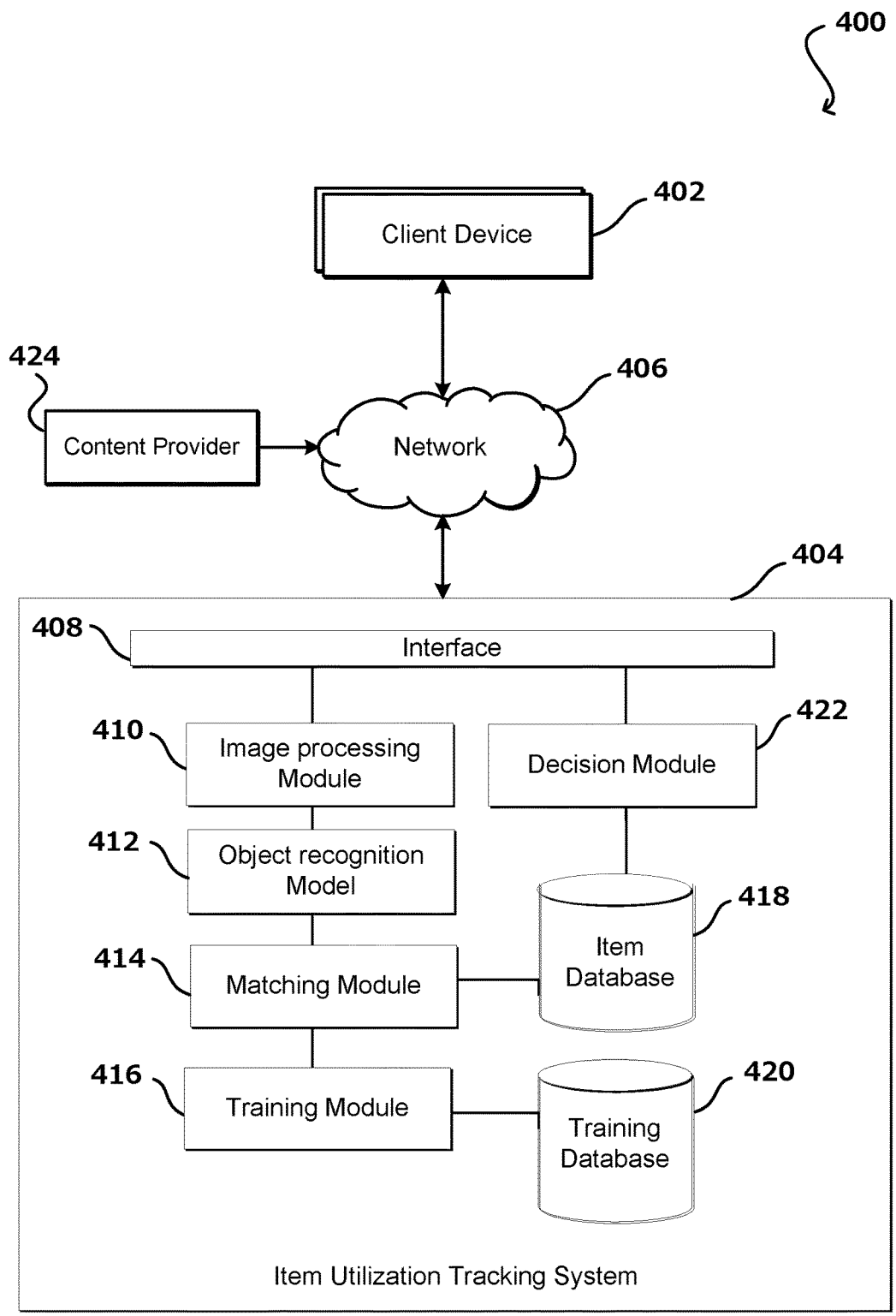
FIG. 4 illustrates an example computing system for computer vision based item utilization tracking, in accordance with various embodiments of the present disclosure.

FIG. 4 illustrates an example computing system 400 for computer vision based item utilization tracking, in accordance with various embodiments of the present disclosure. In various embodiments, a system 400 may enable a client device 402 to receive content from item utilization tracking system 404. The device client 402 may access a content provider 424, such as an application or other web platform or service to request item utilization tracking or recommendation based on item utilization. In some embodiments, item utilization tracking system 404 may be implemented at one or more servers at the content provider 424 or a separate service provider. The client may utilize the item utilization tracking system 404 to upload image data to support utilization tracking items. In some other embodiments, the item utilization tracking system 404 may be implemented remote from the content provider 424, such that the content provider 424 provides data to the item utilization tracking system, the item utilization tracking system 404 may either transmits content, such as recommendations back to the content provider 424 or directly to the client device 402.

The client device 402 may represent a client-side computer device that includes any type of computing devices having network connectivity, including personal computers, tablet computers, smart phones, notebook computers, and the like. Multiple client devices 402 may be connected to the item utilization tracking system 404 via the network 406, and the item utilization tracking system 404 may provide individualized service to each client device 402, such as based on the type of client device. In some embodiments, the client device 402 may be a virtual device, Web program, or software application that can communicate with the item utilization tracking system 404 directly or over the network 406, making and receiving requests and calls, and sending and receiving data. The network 406 can include any appropriate network, such as the Internet, a local area network (LAN), a cellular network, an Ethernet, Wi-Fi, Bluetooth, radiofrequency, or other such wired and/or wireless network. item utilization tracking system 404 can include any appropriate resources for performing the various functions described herein, and may include various servers, data stores, and other such components known or used for providing content from across a network (or from the cloud).

In various embodiments, the item utilization tracking system 404 may include functional and data aspects illustrated herein as an interface 408, an image processing module 410, an object recognition model 412, a matching module 414, a training module 416, an item database 418, a training database 420, and a decision module 422. One or more of the modules and databases described above may be implemented jointly or separated further into additional modules. For example, the interface face 408 can facilitate communication between the client device 402 and the item utilization tracking system 404. Requests received by the item utilization tracking system 404 can be received by the interface 408. Example requests may include a request for data regarding utilization of a certain item among others. The interface 408 may also provide outputs from the item utilization tracking system 404 to the client 402, such as notifications or other content. The interface 408 may also include components such as specific application programming interfaces (APIs), load balancers, request and/or data routers, and the like. The interface 408 may also facilitate communication with the content provider 402, whether local or remote.

The image processing module 410 may receive images from the client device 402 through the interface and process the images to prepare the images for optimal feature extraction by the object recognition model. The image processing module may determine regions of the image that pertain to individual objects and separate them for analysis by the object recognition model, among other image processing functions. The object recognition model 412 may include one or more trained machine learning models, such as convolutional neural networks trained to determine various attributes of the items in the image. The matching module 414 may receive the attributes or features determined by the object recognition model 412 and identify a corresponding item from the item database 418, which contains item profiles for each item in a collection. In various embodiments, the previously describe electronic catalog or collection profile may be implemented via the item database. The item database is updated when an image indicative of a utilization instance is received, thereby maintaining a record of the utilization instances of each item. The decision module 422 may access the item database, and more specifically, the utilization records of the items. The decisions module 422 may generate notification accordingly based on the utilization records. The training module 416 may associate data and attributes determined for the same item through different images such that the object recognition module and detect attributes from images providing limited information. The training database 420 may store these associations and other training data.

Figure 5:
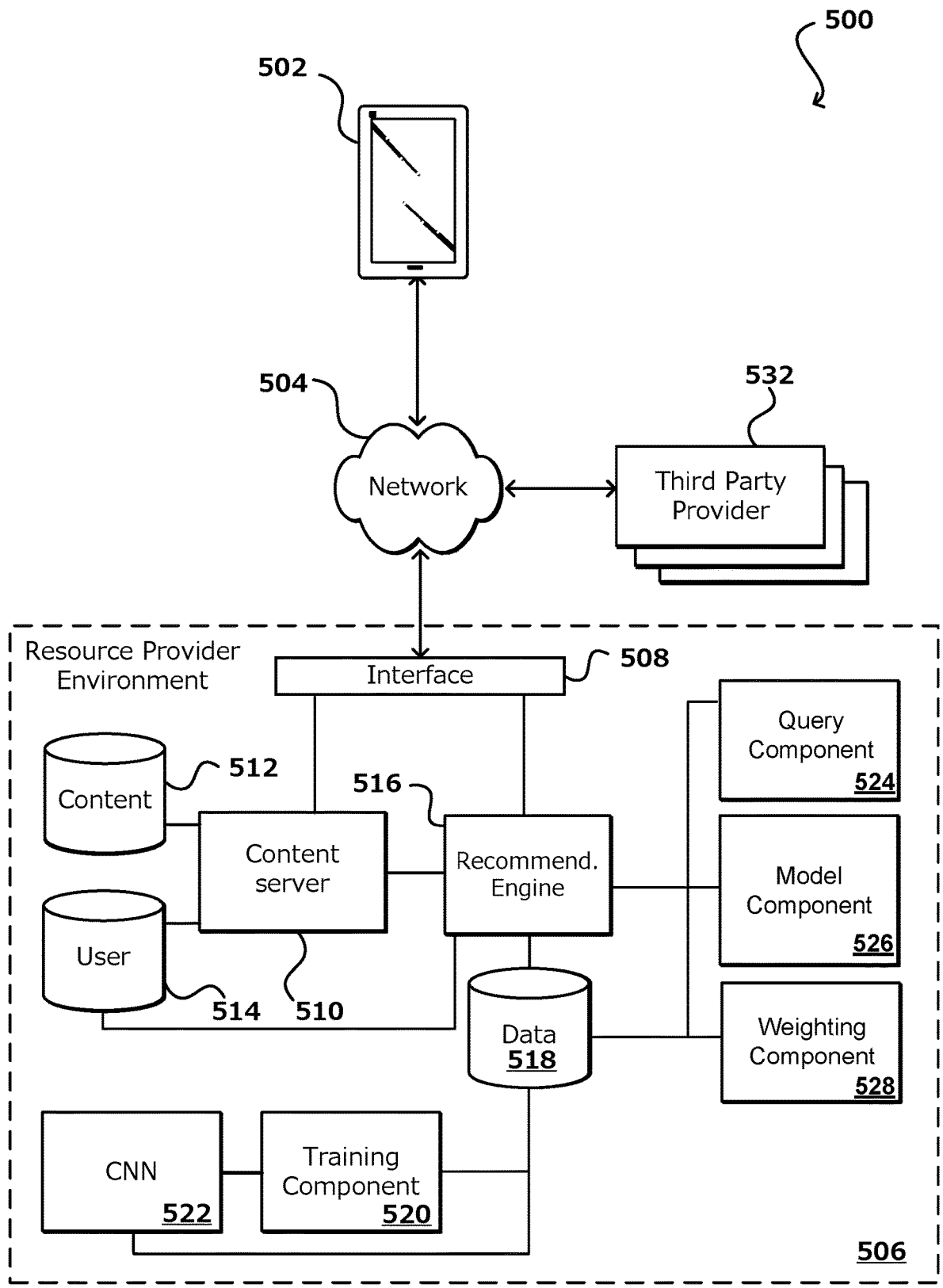
FIG. 5 illustrates an example environment in which aspects of the various embodiments can be implemented, in accordance with various embodiments of the present disclosure.

FIG. 5 illustrates an example environment 500 in which aspects of the various embodiments can be implemented. Specifically, the example environment 500 includes a recommendation engine that can make recommendations based on a collection profile, such as a profile of items in a wardrobe. The recommendations may further be based on utilization of items in the collection, as determined through the computer vision based item utilization tracking techniques of the present disclosure. For example, the recommendation may include suggested items for purchase based on detected style or trends in the collection of items. The recommendations may also include a recommendation to sell an item that has not been used in a certain period of time, among other recommendations. In this example, a computing device 502 is able to make a call or request across one or more networks 504 to a content provider environment 506. The network(s) can include any appropriate network, such as the Internet, a local area network (LAN), a cellular network, an Ethernet, or other such wired and/or wireless network. The content provider environment 506 can include any appropriate resources for providing content from a resource provider, as may include various servers, data stores, and other such components known or used for providing content from across a network (or from the "cloud"). In this example, a request received to the content provider environment 506 can be received by an interface layer 508 of the environment.

As known for network environments, the interface layer can include components such as interfaces (e.g., APIs), load balancers, request and/or data routers, and the like. If the request is a request for content, such as for content for a page to be displayed in an application, information for the request can be directed to one or more content managers 510 and/or content servers, which can obtain the content from a content data store 514 or other such repository to be sent back across the network(s) to the computing device. In some embodiments, information for the request might also be compared against user data in a user data store 512 or other such location do determine, for example, whether the user has access rights to that content. In some embodiments user data might also be analyzed to determine which type of content to provide additional supplemental content to provide with the primary content, and the like. In various embodiments, recommendations may be determined by a recommendation engine 516 and provider by the content server 510 based upon data stored in the data repository 518 or determined using a query component 524 or model component 526, among other such options. In some embodiments the recommendation engine 516 may access a weighting component 528 or other such mechanism to weigh the data, such as various components of training data, in determining the recommendations.

In various embodiments, determining the recommendation may include ranking various actions content items in which all or a subset of the plurality of content items are assigned a match score indicating how well matched (i.e., strongly associated) the respective content is with respect to user or account. A recommended action or content item may be one whose match score is higher than a threshold score or ranked within a certain number of positions. The individual match scores can be determined at least in part using neural networks 522 such as a CNN through training on an appropriate data set. The training component 520 can perform the training on the models and provide the resulting results and/or trained models for use in determining the individual match scores or the recommended products. The training component 520 can be the same system or service that is used to train a localizer, as well as various face detectors or other models, networks, or algorithms discussed or suggested herein.

In the example shown in FIG. 5, a neural network 522 such as a convolutional neural network (CNN) can be trained using, for example, training images of various collections of items. As mentioned, for CNN-based approaches there can be pairs of images submitted that are classified by a type of attribute (e.g., an association with a certain product), while for GAN-based approaches a series of images may be submitted for training that may include metadata or other information useful in classifying one or more aspects of each image. For example, a CNN may be trained to perform object recognition using images of different types of objects, and then learn how the attributes relate to those objects using the provided training data. In certain embodiments, training a neural network may involve significant use of computation resources and time, such that this may correspond to a preparatory step to servicing search requests and/or performed relatively infrequently with respect to search request servicing and/or according to a schedule. According to some embodiments, training data and respective can be located in a data store 518. A training component 520 can utilize the training data set to train the neural network 522.

As further described, neural networks can include several learning layers in their architecture. A query image from the training data set is analyzed using the neural network to extract a feature vector from the network before the classification layer. This feature vector describes the content of the training data. This process can be implemented for each piece of training data in the data set, and the resulting object feature vectors can be stored in a data store. In various embodiments, the resulting object feature vectors can be compressed for improved processing. For example, the object feature vectors generated by the neural network may include object feature vectors that have a large number of dimensions. The dimensions of these object feature vectors can be reduced by applying at least one of Principal Component Analysis (PCA) or Multi-Dimensional Scaling (MDS). Advantageously, such an approach can reduce storage demands and significantly improve latency performance. Additionally, such an approach can remove or at least reduce noise in the transformed space since the tailing dimensions generally correspond to noise and discarding them helps to focus on the useful signal when measuring similarities. The initial query image in some embodiments may be received from client device 502 over network 504 and processed by query component 524. In some embodiments, the query image can be received when a selection of an image from a third party provider 532 or content provider environment 506 is selected, such as through the selection of a content item. When a query image is received, for example, a set of query object descriptors may be obtained or determined for the query image. For example, if the query image is not part of an electronic catalog and does not already have associated feature descriptors, the system may generate feature descriptors (both local feature descriptors and object feature descriptors) for the query content in a same and/or similar manner that the feature descriptors are generated for the collection of images, as described. Also, for example, if the query image is part of the collection then the feature descriptors for the query image may be obtained from the appropriate data store.

Additionally, the query image can be analyzed to determine local feature descriptors for the query image. Using the clustered feature vectors and corresponding visual words determined for the training images, a histogram for the query image can be determined. The query image can also be analyzed using the neural network 522 to extract a feature vector from the network before the classification layer. This feature vector describes the subject and/or objects shown in the image. Using the local feature descriptors and object feature descriptors, visually similar images (i.e., image data representing facial features of various other uses) and their values of associations with one or more products in content provider environment 506 can be identified.

Figure 6:
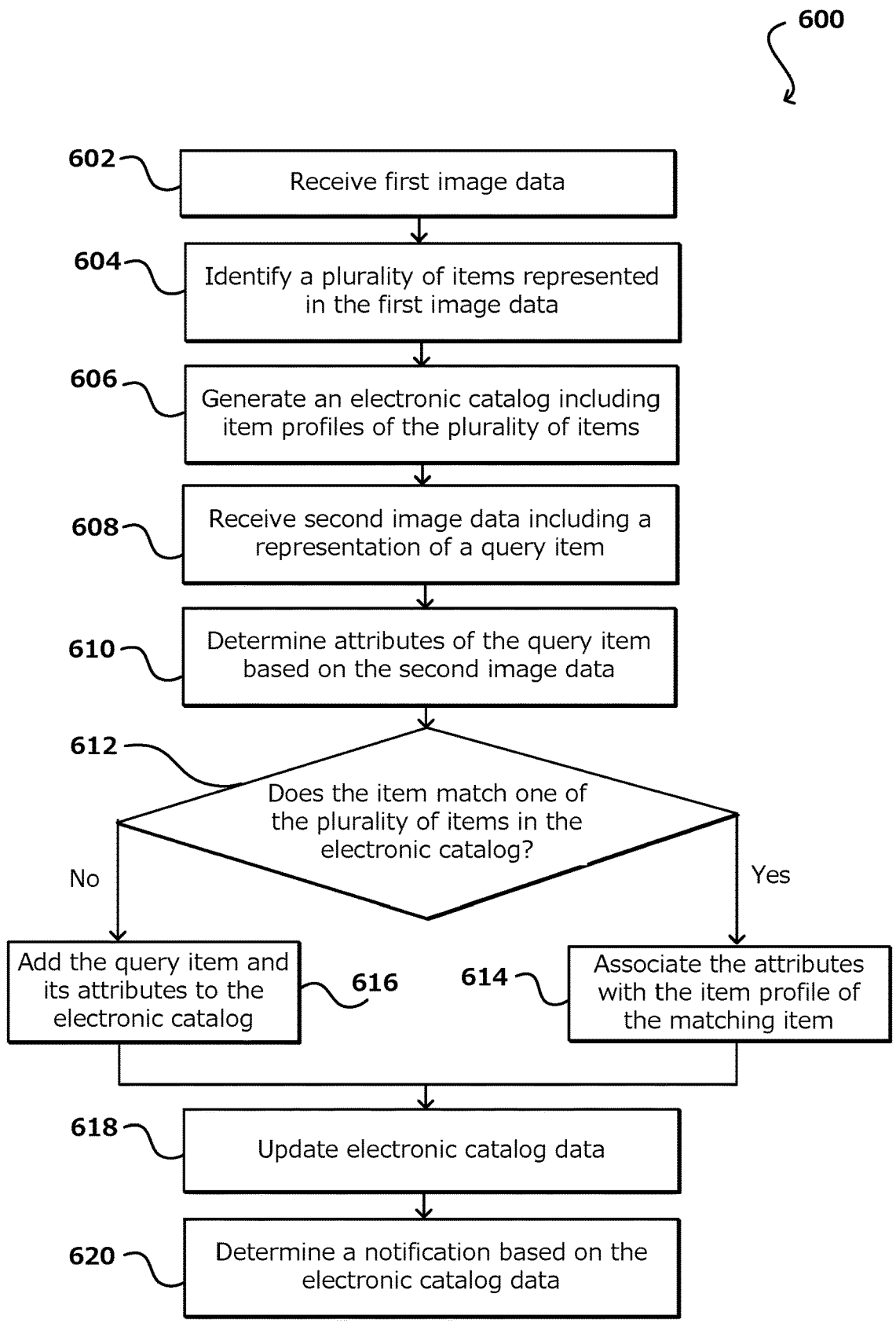
FIG. 6 illustrates an example process of determining recommendations based on a computer vision generated profile of a collection of items, in accordance with various embodiments of the present disclosure.

FIG. 6 illustrates an example process 600 of determining recommendations based on a computer vision generated profile of a collection of items, in accordance with various embodiments. It should be understood that, for any process discussed herein, there can be additional, fewer, or alternative steps performed in similar or alternative orders, or in parallel, within the scope of the various embodiments. In this example, a first image is received 602, which includes representations of a plurality of items. The plurality of items is then identified 604. An electronic catalog of the identified plurality of items can then be generated 606. The electronic catalog may include individual item profiles of each of the identified plurality of items. The item profile for an item may include various attributes and other data associated with that item, such as attributes determined from analysis of the image data representation of the item. Such attributes may be determined using an object detection model which may extract a feature vector from the image data representation of the item and determined attributes or classification therefrom using a machine learning model such as a neural network. The electronic catalog may serve as a baseline database of the items in a collection of item, such as a wardrobe. Second image data is then received 608, in which the second image data includes a representation of a query item. Attributes of the query item can be determined 610 by analyzing the second image data, such as through the object recognition model or other computer vision or machine learning techniques. Base on the attributes, it can be determined 612 whether the query item matches one of the items in the electronic catalog. In various embodiments, if it is determined that the query item does correspond to one of the items in the electronic catalog, the determined attributes are associated 614 with the item profile of the corresponding item. In various embodiments, if the query item does not correspond to one of the items in the electronic catalog, the query item can be added 616 to the electronic catalog as a new entry. Thus, the electronic catalog can be updated 618 with the new information obtained from the second image data. A notification, such as a recommendation, can then be determined 620 based on the electronic catalog, which includes data regarding the items in the collection, such as style, type, brand, color, as well as frequency of utilization.

Figure 7:
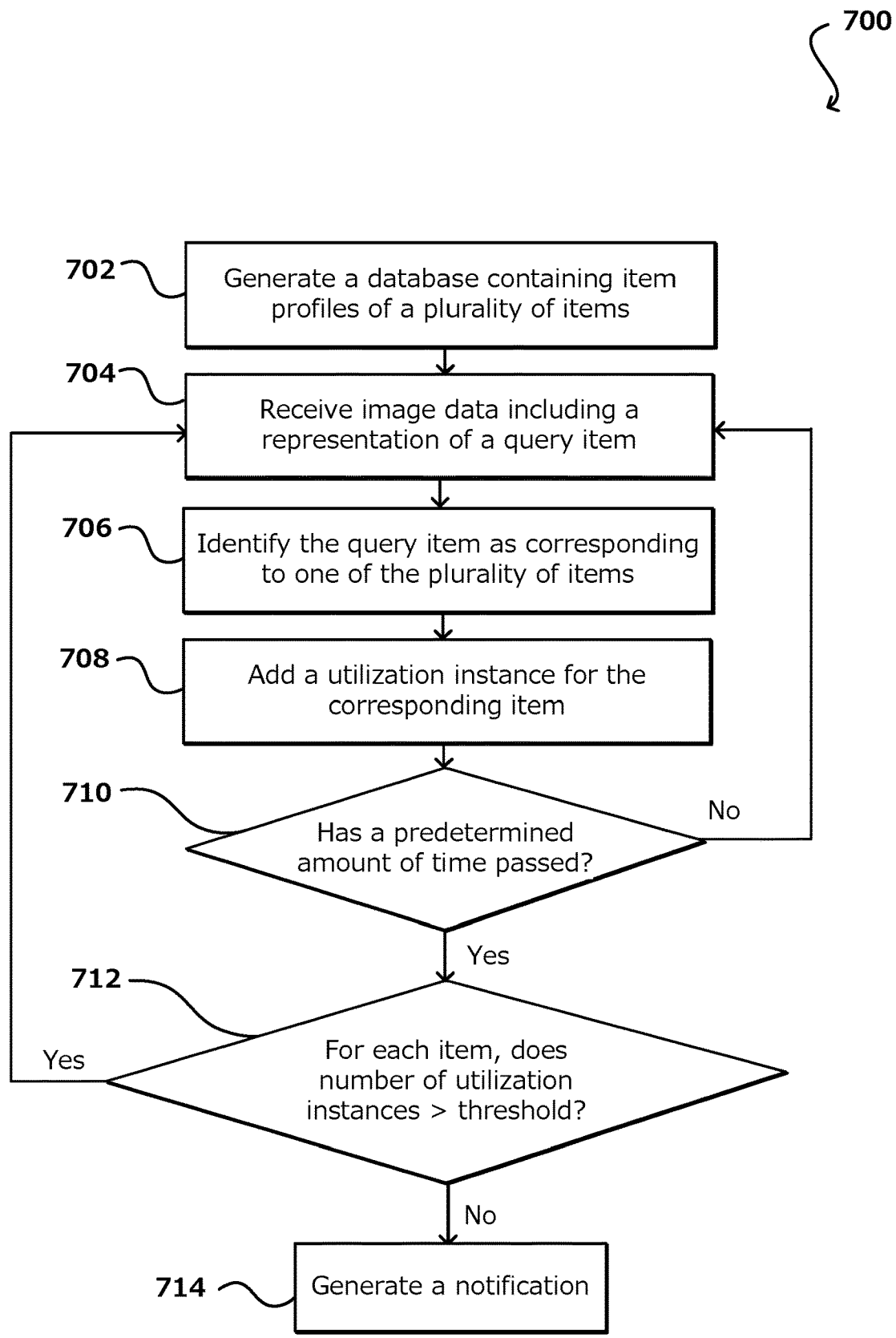
FIG. 7 illustrates an example process of determining a notification based on computer vision tracking of item utilization, in accordance with various embodiments of the present disclosure.

FIG. 7 illustrates an example process 700 of determining a notification based on computer vision tracking of item utilization, in accordance with various embodiments. In this example, a database containing item profiles of a plurality of items is generated 702. The database may include the electronic catalog discussed above, and may be generated using computer vision analysis of an image of the plurality of item. In other embodiments, the database may be generated through manual data entry or through other means. Image data is then received 704, in which the image data includes a representation of a query item. The query item may be identified 706 as corresponding to one of the plurality of items in the database. A utilization instance is then added 708 for the corresponding item. Specifically, the database may include a utilization record for each of the plurality of items, and when an image is received featuring one of the items, a utilization instance is added for that item in the utilization record. It can then be determined 710 if a predetermined amount of time as passed. If a predetermined amount of time has not passed, image data continues to be received 704. If a predetermined amount of time has passed, then it is determined 712, for each item, whether the number of utilization instances is greater than a threshold number. The number of utilization instances for an item being greater than the threshold may indicate that the respective item is being actively utilized. If the number of utilization instances falls below the threshold number, that may indicate that the item is being underutilized, and a notification is generated 714 accordingly, and provided to the user through a user device.

Figure 8:
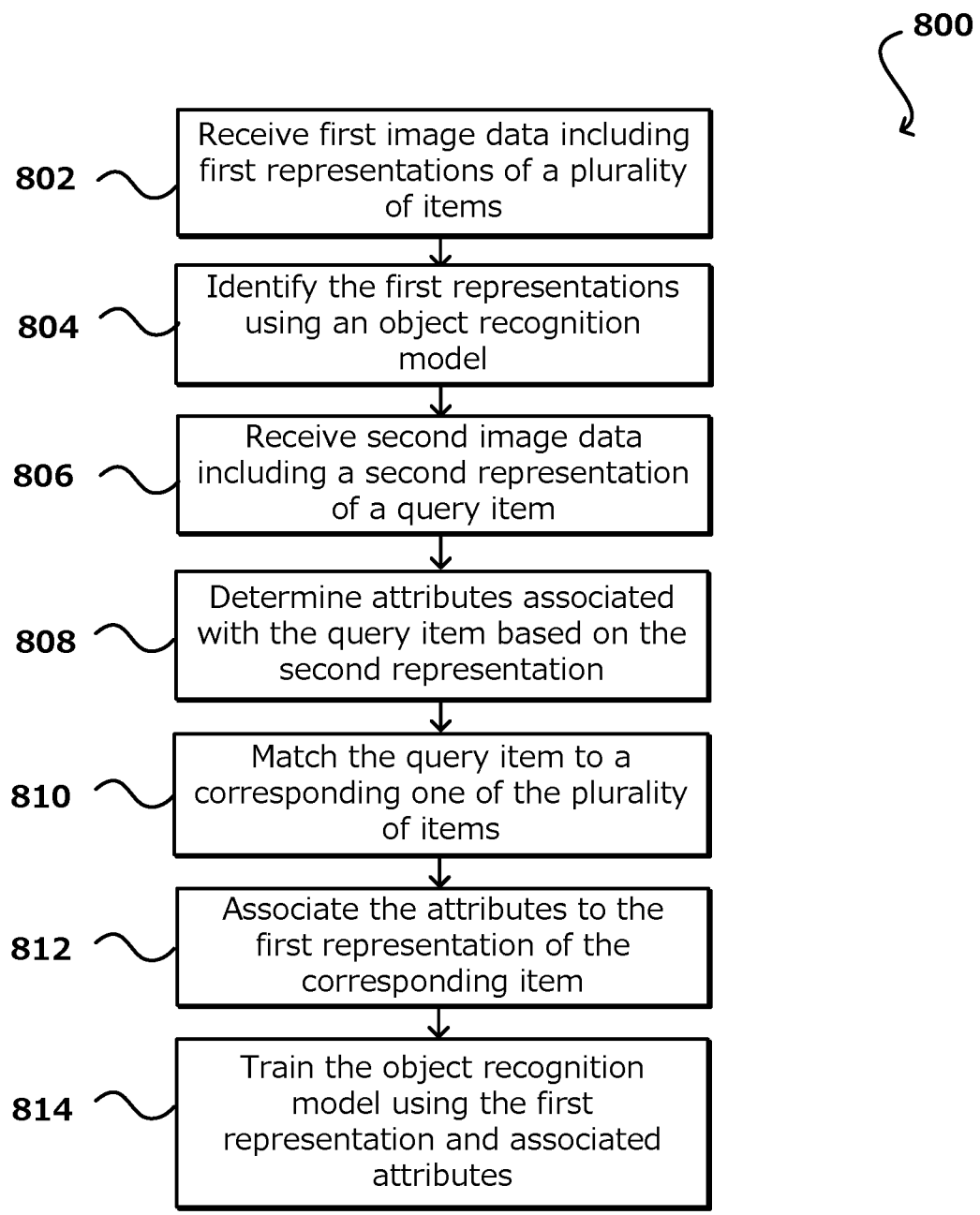
FIG. 8 illustrates an example process of training an object recognition model to identify partially obscured objects, in accordance with various embodiments of the present disclosure.

FIG. 8 illustrates an example process 800 of training an object recognition model to identify partially obscured objects, in accordance with various embodiments. In this example, first image data including first representations of a plurality of items is received 802. The first representations may be identified 804 from the first image data using an object recognition model. In some embodiments, the first representations of the plurality of items may include partially obstructed, poorly angled, or otherwise incomplete or challenging views of the items. Second image data may be received 806, in which the second image data includes a second representation of a query item. In some embodiments, the second representation may include a view of the query item being utilized. For example, in a scenario in which the query item is an apparel item, the second representation may include a view of the apparel being worn, such as illustrated in FIG. 2B. Thus, in such scenarios, the second representation may include a better item view. Attributes associated with the query item can then be determined 808 using the second representation. For example, various object recognition, machine learning, or computer vision techniques may be utilized to determine the attributes, such as by extracting and analyzing a feature vector of the second representation and/or the second image data. The query item may then be matched 810 to a corresponding item in the plurality of items represented in the first image. The attributes may then be associated 812 with the first representation of the corresponding item. The object recognition model used to analyze the first representation may be trained 814 or further trained using the first representation and the associated attributes. This way, the model may be further trained to determined attributes given images in which objects are incomplete or otherwise have challenging views.

Figure 9:
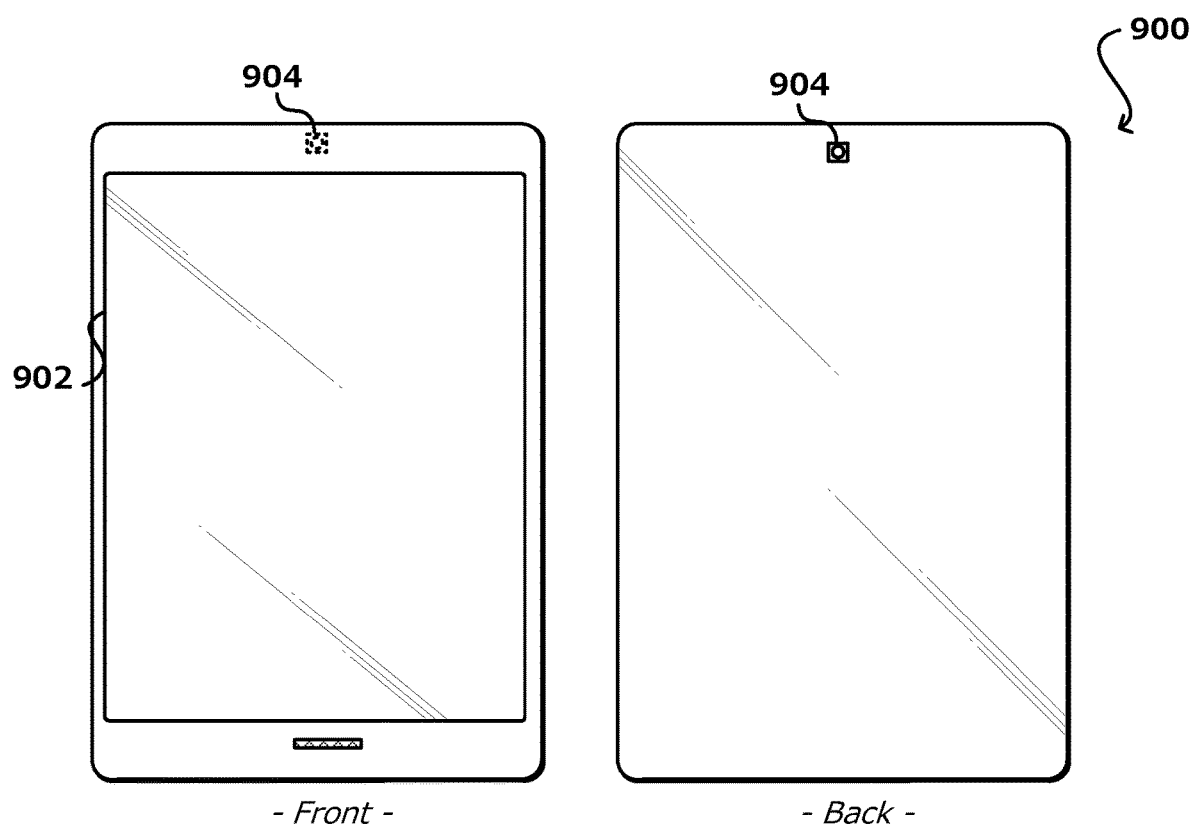
FIG. 9 illustrates an example computing device that can be used, in accordance with various embodiments of the present disclosure.

FIG. 9 illustrates an example computing device 900 that can be used in accordance with various embodiments. Although a portable computing device (e.g., a smart phone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, television set top boxes, and portable media players, among others. In this example, the computing device 900 has a display screen 902, which under normal operation will display information to a user facing the display screen (e.g., on the same side of the computing device as the display screen). The computing device in this example can include one or more media capture elements, in this example including one image capture element 904 on the back side of the device, although it should be understood that image capture elements could also, or alternatively, be placed on the sides or corners of the device, and that there can be any appropriate number of capture elements of similar or different types. Each image capture element 904 may be, for example, a camera, a charge-coupled device (CCD), a motion detection sensor, or an infrared sensor, or can utilize any other appropriate image capturing technology. The computing device can also include at least one microphone or other audio capture element(s) capable of capturing other types of input data, as known in the art, and can include at least one orientation-determining element that can be used to detect changes in position and/or orientation of the device. Various other types of input can be utilized as well as known in the art for use with such devices.

Figure 10:
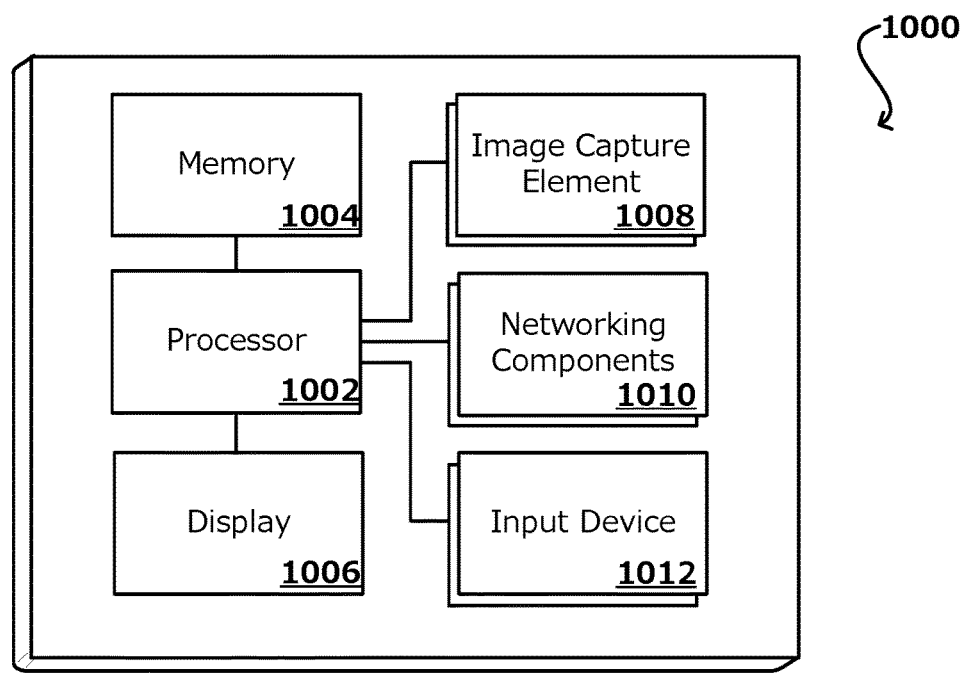
FIG. 10 illustrates a set of example components of one or more devices of the present disclosure, in accordance with various embodiments of the present disclosure.

FIG. 10 illustrates a set of example components of one or more devices 1000 of the present disclosure. In this example, the device includes at least one processor 1002 for executing instructions that can be stored in a memory device or element 1004. As would be apparent to one of ordinary skill in the art, the device can include many types of memory, data storage or computer-readable media, such as a first data storage for program instructions for execution by the processor 1002, the same or separate storage can be used for images or data, a removable memory can be available for sharing information with other devices, and any number of communication approaches can be available for sharing with other devices. The device typically will include some type of display element 1006, such as a touch screen, electronic ink (e-ink), organic light emitting diode (OLED) or liquid crystal display (LCD), although devices such as portable media players might convey information via other means, such as through audio speakers. As discussed, the device in many embodiments will include at least one image capture element 1008, such as at least one ambient light camera that is able to image a user, people, or objects in the vicinity of the device. An image capture element can include any appropriate technology, such as a CCD image capture element having a sufficient resolution, focal range and viewable area, to capture an image of the user when the user is operating the device. Methods for capturing images or video using an image capture element with a computing device are well known in the art and will not be discussed herein in detail. It should be understood that image capture can be performed using a single image, multiple images, periodic imaging, continuous image capturing, image streaming, etc.

The device can include one or more networking components 1010 enabling the device to communicate with remote systems or services such as content providers and rights determining systems. These components can include, for example, wired or wireless communication components operable to communicate over a network such as a cellular network, local area network, or the Internet. The device can also include at least one additional input device 1012 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device. As discussed, different approaches can be implemented in various environments in accordance with the described embodiments.

Figure 11:
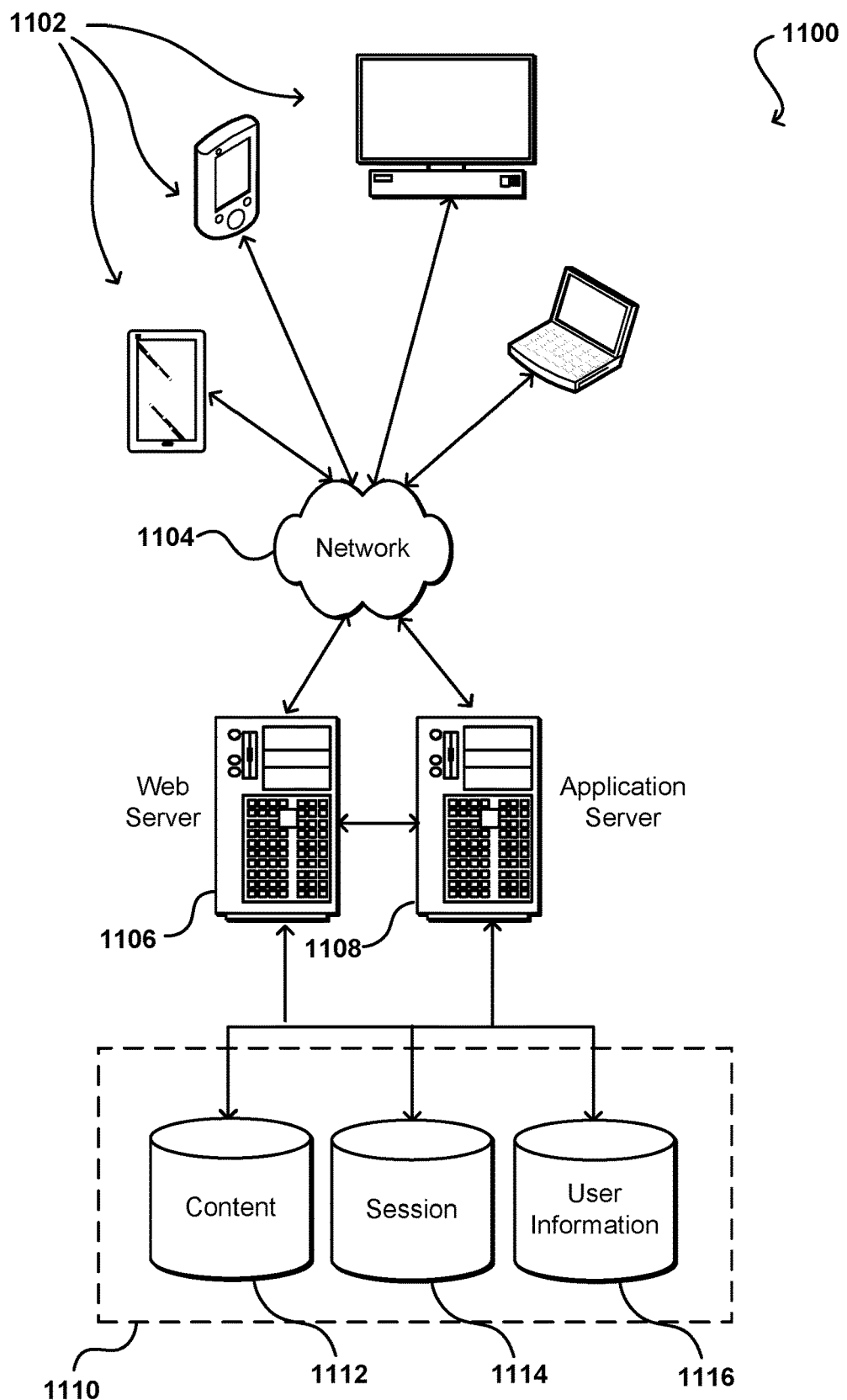
FIG. 11 illustrates an example environment for implementing aspects, in accordance with various embodiments of the present disclosure.

FIG. 11 illustrates an example environment 1100 for implementing aspects in accordance with various embodiments. As will be appreciated, although a Web-based environment is used for purposes of explanation, different environments may be used, as appropriate, to implement various embodiments. The system includes an electronic client device 1102, which can include any appropriate device operable to send and receive requests, messages or information over an appropriate network 1104 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 1106 for receiving requests and serving content in response thereto, although for other networks, an alternative device serving a similar purpose could be used, as would be apparent to one of ordinary skill in the art.

The illustrative environment includes at least one application server 1108 and a data store 1110. It should be understood that there can be several application servers, layers or other elements, processes or components, which may be chained or otherwise configured, which can interact to perform tasks such as obtaining data from an appropriate data store. As used herein, the term data "store" refers to any device or combination of devices capable of storing, accessing and retrieving data, which may include any combination and number of data servers, databases, data storage devices and data storage media, in any standard, distributed or clustered environment. The application server 1108 can include any appropriate hardware and software for integrating with the data store 1110 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 1106 in the form of HTML, XML or another appropriate structured language in this example. The handling of all requests and responses, as well as the delivery of content between the client device 1102 and the application server 1108, can be handled by the Web server 1106. It should be understood that the Web and application servers are not required and are merely example components, as structured code discussed herein can be executed on any appropriate device or host machine as discussed elsewhere herein.

The data store 1110 can include several separate data tables, databases or other data storage mechanisms and media for storing data relating to a particular aspect. For example, the data store illustrated includes mechanisms for storing content (e.g., production data) 1112 and user information 1116, which can be used to serve content for the production side. The data store is also shown to include a mechanism for storing log or session data 1114. It should be understood that there can be many other aspects that may need to be stored in the data store, such as page image information and access rights information, which can be stored in any of the above listed mechanisms as appropriate or in additional mechanisms in the data store 1110. The data store 1110 is operable, through logic associated therewith, to receive instructions from the application server 1108 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 1102. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein. The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system 1100 in FIG. 11 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof. In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®. The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate.

Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc. Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information.

The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed. Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A system, comprising:
   at least one computing device processor; and
   a memory device including instructions that, when executed by the at least one computing device processor, cause the system to:
   receive first image data including a representation of a scene containing a collection of apparel items;
   analyze the first image data to detect first representations of individual items of the collection of apparel items, the first representations representing partially obscured views of at least a portion of the collection of apparel items;
   determine, using a neural network, first attributes of the individual items based on the respective first representations, wherein the neural network is trained to determine attributes for a detected item in an image;
   generate an electronic catalog of the collection of apparel items, individuals of the apparel items associated with corresponding first attributes;
   receive second image data including a second representation of one of the apparel items being worn;
   determine, using the neural network, second attributes of the apparel item being worn, at least one of the second attributes being unable to be detected in the first image data;
   identify the apparel item being worn as corresponding to one of the apparel items in the electronic catalog; and
   update the electronic catalog to associate the second attributes with the corresponding apparel item in the electronic catalog.

2. The system of claim 1, wherein the second representation represents a view of the item being worn by a user.

3. The system of claim 1, wherein the instructions when executed further cause the system to:
   receive additional image data including additional representations of apparel items being worn, the apparel items being worn corresponding to at least some of the apparel items in the electronic catalog;
   determine, based on the additional image data how often respective apparel items in the electronic catalog are worn during a period of time; and
   determine a recommendation based at least in part on how often certain apparel items in the electronic catalog are worn.

4. The system of claim 3, wherein the recommendation includes a prompt to offer one or more of the apparel items in the electronic catalog for consumption on an electronic marketplace.

5. A computer-implemented method, comprising:
   receiving first image data including first representations of a plurality of items wherein the first representations represent partially obstructed or angled views of at least a portion of the plurality of items;
   determining, using a neural network, respective attributes for the plurality of items, wherein the neural network is trained to determine attributes for a detected item in an image;
   generating a database of the plurality of items associated with the respective attributes;
   receiving second image data including a second representation of an item in the plurality of items, the second image data associated with a utilization instance of the item;
   determining, using the neural network, additional attributes for the item based on the second representation, at least one of the additional attributes being unable to be detected in the first image data; and
   associating the additional attributes with the respective item in the plurality of items in the database.

6. The method of claim 5, further comprising:
   analyzing the first image data to identify the first representations of the plurality of items from the first image data; and
   analyzing the first representations using one or more object recognition models to determine the respective attributes.

7. The method of claim 5, further comprising:
   identifying an estimated match between the second representation and the item;
   requesting confirmation of the match; and
   associating the second representation or the additional attributes with the first representation of the item.

8. The method of claim 5, further comprising:
   training the neural network using training images of items annotated with attribute information.

9. The method of claim 5, wherein the additional attributes includes at least a time parameter associated with the utilization instance.

10. The method of claim 9, wherein the database includes a record of respective utilization instances of the plurality of items.

11. The method of claim 10, wherein the recommendation includes at least one of:
- a recommendation based at least in part on the record indicating one or more items having fewer than a threshold number of utilization instances;
- a recommendation based at least in part on attributes of the plurality of items;
- an estimated market value of one or more items;
- a hyperlink to a Web page with recommended products for consumption; or
- customized content.

12. The method of claim 5, further comprising:
- obtaining data associated with an account, the data including engagement with one or more items offered for consumption, the one or more items offered for consumption having known attributes, respectively;
- matching one or more of the plurality of items with the one or more items offered for consumption, respectively; and
- associating the known attributes with the one or more of the plurality of items, respectively.

13. The method of claim 5, further comprising:
- overriding one or more of the first attributes based at least in part on one or more of the second attributes.

14. The method of claim 5, wherein the first and second attributes for the item include any one or combination of item type, style classification, brand, color, material, pattern, texture, size, length, utilization dates, frequency of utilization, utilization with another item, purchase date, or current market value.

15. The method of claim 5, wherein the first representations represent a collection of apparel item in storage positions, at least one apparel item in the collection being in a folded or hung position, and wherein the second representation represents an apparel item being worn.

16. The method of claim 5, further comprising:
- receiving third image data including a representation of a second plurality of items;
- comparing the second plurality of items to the plurality of items in the database;
- identifying a new item or a missing item in the second plurality of items relative to the plurality of items in the database; and
- updating the database to either add the new item or remove the missing item.

17. A system, comprising:
- at least one computing device processor; and
- a memory device including instructions that, when executed by the at least one computing device processor, cause the system to:
  - receive first image data including first representations of a plurality of items, wherein the first representations represent partially obstructed or angled views of at least a portion of the plurality of items;
  - determine, using a neural network, respective attributes for the plurality of items, wherein the neural network is trained to determine attributes for a detected item in an image;
  - generate a database of the plurality of items associated with the respective attributes;
  - receive second image data including a second representation of an item in the plurality of items, the second image data associated with a utilization instance of the item;
  - determine, using the neural network, additional attributes for the item based on the second representation, at least one of the additional attributes being unable to be detected in the first image data; and
  - associate the additional attributes with the respective item in the plurality of items in the database.

18. The system of claim 17, wherein the second image data is captured via a camera, the camera controlled by a device remote from the camera or via a voice command.

19. The system of claim 17, wherein the additional attributes includes at least a time parameter associated with the utilization instance, and wherein the database includes a record of respective utilization instances of the plurality of items.

* * * * *